Patented Apr. 16, 1946

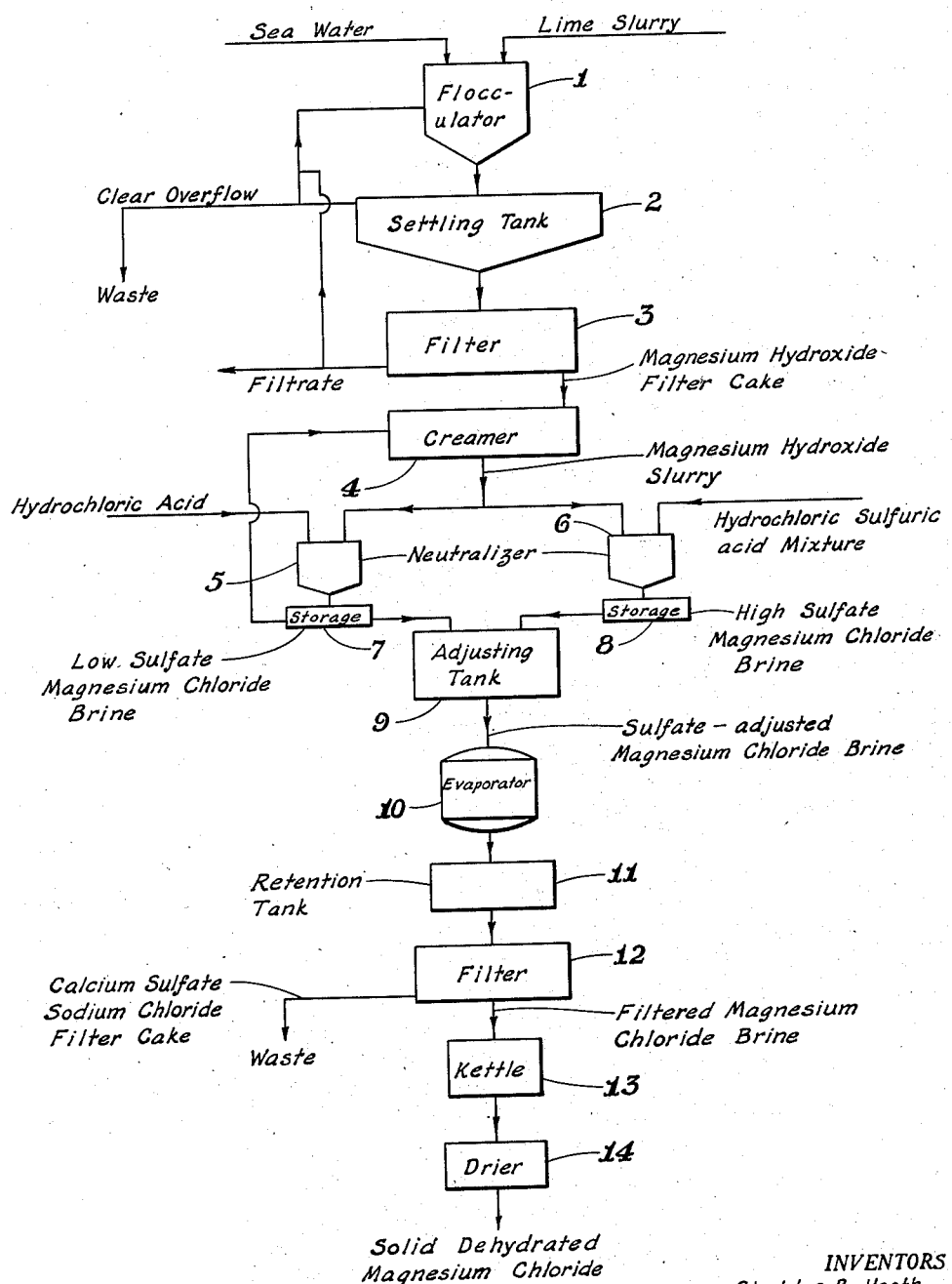

2,398,743

UNITED STATES PATENT OFFICE 2,398,743

RECOVERY OF MAGNESIUM COMPOUNDS

Sheldon B. Heath and Forest R. Minger, Midland, Mich., assignors to The Dow Chemical Company, Midland, Mich., a corporation of Michigan Application April 24, 1944, Serial No. 532,388

7 Claims. (Cl. 23—91)

This invention relates to a method of recovering magnesium chloride from sea water and other natural brines containing the same.

The principal object of the invention is to provide an improved method of treating sea water and like brines to separate the magnesium salts dissolved therein and recover the same in the form of solid magnesium chloride substantially free of the impurities normally present in such brines. Other objects will be apparent from the description.

The process of the invention is based on a series of reactions which include mixing the sea water or other magnesium-containing brine with alkali, thereby precipitating insoluble magnesium hydroxide, separating the latter from the spent brine, converting the separated hydroxide to magnesium chloride solution by neutralization with hydrochloric acid, and then evaporating the solution to form solid magnesium chloride. The manner in which these steps are to be carried out in order to obtain a final product of high purity is hereinafter set forth in detail.

The invention may best be explained with reference to the accompanying drawing, which illustrates diagrammatically the flow of materials in a preferred embodiment of the new process.

The raw material, e. g. sea water or any of a number of natural inland brines, bitterns, and the like, invariably contains, in addition to the desired magnesium chloride, substantial proportions of dissolved calcium salts and of sodium chloride. In most cases small but significant proportions of other substances, such as sulfates, carbonates, and borates, are also present. All these materials are, of course, to be separated from the magnesium chloride.

In the process as shown in the drawing, the raw sea water is run into a flocculator 1 in which it is mixed with an aqueous solution or suspension of an alkali, conveniently milk of lime which is prepared by slaking quicklime in water, classifying to remove sediment, and thickening the resulting mixture to a concentration of 10 to 15 pounds of lime per cubic foot. The alkali converts the dissolved magnesium salts in the sea water to insoluble magnesium hydroxide, the latter forming as a flocculent precipitate which is separated from the sea water and converted to magnesium chloride in the subsequent stages of the process.

In the case of sea water and other brines which have an appreciable content of dissolved boron compounds, careful control of the proportion of alkali employed is necessary to minimize the quantity of boron retained as impurity in the settled magnesium hydroxide precipitate. Thus it has been found that, when an amount of lime or other alkali is used which is less than sufficient to react with all the magnesium salts in the sea water, the precipitated magnesium hydroxide carries with it, probably by adsorption, a large proportion of the boron compounds in the raw water. These compounds persist through the neutralization and subsequent steps of the process, and appear as impurities in the final magnesium chloride. However, if, for the precipitation of the magnesium hydroxide, an excess of alkali is added, the boron compounds are not appreciably retained by the magnesium hydroxide precipitate, but remain in solution and are discarded with the spent brine. Minimum retention of boron by the hydroxide results when the lime or other alkali is added in such excess as to produce in the aqueous suspension a soluble alkalinity corresponding to a normality of 0.01 N or above, preferably about 0.015 N to 0.03 N; with lime, these values correspond roughly to a 10 to 30 per cent overliming of the sea water. A higher alkalinity, e. g. up to the limit of solubility of calcium hydroxide in the brine, does not unfavorably affect the operation of the process, although it has no material advantage as regards the reduction of the boron content of the magnesium hydroxide. The limit of solubility of calcium hydroxide in sea water corresponds to a soluble alkalinity of about 0.04 N, while with stronger brines the solubility of calcium hydroxide may rise to a soluble alkalinity of as much as 0.065 N.

Following the precipitation step in the flocculator 1 the treated sea water is transferred to a settling tank 2, such as a Dorr thickener, in which it is maintained in a quiescent state, so that the magnesium hydroxide settles to the bottom of the tank as a thick sludge, which is withdrawn when it contains from about 5 to 15 per cent by weight of anhydrous magnesium hydroxide. The bulk of the sea water remains as a supernatant clarified liquor, which is ordinarily allowed to overflow to waste.

The thickened magnesium hydroxide sludge from the settling tank 2 is pumped to a filter 3, conveniently a suction filter of the Moore type, in which the magnesium hydroxide is recovered as a cake, the filtrate being discarded or returned to the flocculator for reworking. The wet filter cake of magnesium hydroxide, containing small amounts of calcium salts, sodium chloride, carbonates, and other impurities, is forwarded for neutralization with hydrochloric acid to convert it to magnesium chloride.

However, since direct neutralization of the solid magnesium hydroxide filter cake with aqueous acid, although operable, presents serious mixing problems due to the somewhat gelatinous nature of the hydroxide and is wasteful of acid, the cake is customarily first dispersed in a suitable medium in which it may more advantageously be treated with the neutralizing acid. For this purpose the cake is loaded into a creamer 4, ordinarily a large tank provided with powerful agitators, and is there mixed thoroughly with water, or with an excess of 8 to 15 per cent by weight magnesium chloride solution derived from a later stage of the process, to form a smooth milk-like slurry, which should preferably contain about 5 to 25 per cent by weight of suspended magnesium hydroxide for easy circulation by pumping. A particularly convenient creaming procedure is first to mix the solid magnesium hydroxide filter cake with a small volume of a slurry of magnesium hydroxide remaining from a previous creaming, and then to dilute the resulting dispersion, while stirring, with the requisite amount of water or magnesium chloride brine. The use of the latter brine is preferred, since it not only improves the ease of dispersing the filter cake and tends to facilitate the subsequent neutralization, but also reduces the volume of liquid to be handled in later stages of the process.

The slurry resulting from the creaming step is ready for neutralization with hydrochloric acid to form a magnesium chloride solution. A preferred mode of treatment is, as shown in the drawing, to combine the neutralization with a sulfuric acid treatment for removal of the calcium salt impurities. To this end the magnesium hydroxide slurry is divided into two streams, one being forwarded to a "low sulfate" neutralizing tank 5, the other to a "high sulfate" neutralizing tank 6. In the "low sulfate" neutralizer 5, the magnesium hydroxide slurry is agitated with 15 to 20 per cent aqueous hydrochloric acid added slowly in a quantity sufficient to react with all of the magnesium hydroxide and to bring the resulting solution to a pH value of 5.5 to 7.0, thereby forming a substantially neutral magnesium chloride solution containing 8 to 20 per cent of the chloride. In the "high sulfate" tank 6 also, the slurry is neutralized to a pH value of 5.5 to 7.0, but in this case the acid employed is a mixture containing 5 to 10 per cent of hydrochloric acid and a similar quantity of sulfuric acid. In this latter tank the magnesium hydroxide slurry is dissolved to form a mixed solution of magnesium chloride and magnesium sulfate. In both the "low" and "high" sulfate neutralizations the calcium compounds present in the creamed magnesium hydroxide slurry are converted largely to the corresponding calcium salts; carbonates, if any, are decomposed.

Following the neutralization, the "low sulfate" and "high sulfate" magnesium chloride brines are transferred to separate storage tanks 7 and 8, a part of the "low sulfate" brine being returned to the creamer 4 as already explained. The two neutralized brines are then combined in a manner to facilitate removal of the dissolved calcium impurities. For this purpose, the "low sulfate" neutralized brine is first run into an adjusting tank 9, a representative sample of the tank contents being taken and analyzed to determine the concentrations therein of dissolved calcium salts and of sulfate, if any. The "high sulfate" brine, which has also been analyzed in similar manner, is then run into the same adjusting tank and mixed with the "low sulfate" brine in the quantity calculated from the analyses that is required to produce a resulting mixture in which the sulfate content is substantially equivalent stoichiometrically to the calcium content thereof. In other words, the "low" and "high" sulfate brines are mixed in such proportion that calcium and sulfate will be present in a ratio substantially corresponding to that in the compound calcium sulfate. The latter does not completely precipitate at this point, however, because of the dilution. Following this mixing, the contents of the tank may be again analyzed and, if found necessary, further small additions of "low" or "high" sulfate brine are made so as to adjust to substantial equivalency of calcium and sulfate. It may sometimes be desirable, however, to permit a slight excess of calcium or of sulfate to remain, to insure substantially complete removal of sulfate or of calcium, as desired, in a later stage of the process.

After the calcium sulfate adjustment has been made, the adjusted brine may be allowed to settle or be filtered to remove any suspended calcium sulfate which may have precipitated at this point, together with silt and other insoluble impurities which may have accumulated, and is then pumped to an evaporator 10 in which it is concentrated until a solution is formed which is sufficiently concentrated so that the calcium sulfate and sodium chloride are substantially insoluble therein. This evaporated brine, which usually contains 30 to 40 per cent by weight of magnesium chloride, most suitably 34 to 35 per cent, is then cooled, if necessary, and transferred to a retention tank 11 in which it is agitated for a period sufficient to permit the insoluble but supersaturated calcium sulfate and sodium chloride to precipitate, usually for 1 to 2 days. Following the retention period, the brine is passed through a filter 12 to remove the precipitated calcium sulfate and sodium chloride, as well as any magnesium hydroxide which may have been formed by hydrolysis during the concentration. The filtered strong brine is then further processed by known methods to yield a solid dehydrated form of magnesium chloride such as is suitable as "cell feed" for electrolytic cells producing magnesium. For example, it is boiled down further in kettle 13, and finally reduced to dryness in drier 14. Alternatively, the concentrated solution from the boil-down kettle, having a $MgCl_2$ content of about 55 to 57 per cent, may be flaked as described in U. S. Patent No. 1,871,428, and the flaked material air-dried to form a suitably dehydrated product. Another alternative is to cool the boiled-down liquor to cause crystallization of hydrated magnesium chloride, then to separate and dry the crystals to a water content corresponding to the mono- or di-hydrate.

This final dehydrated product is substantially free of impurities and may be put directly to any of the ordinary uses of magnesium chloride. For instance, it is well adapted as a raw material for the production of metallic magnesium by electrolysis of its fused chloride.

While the foregoing description presents a preferred mode of carrying out the new process, the details of the individual steps, particularly in the neutralization and impurity removal procedures, obviously admit of some variation without departing from the invention. For instance, although the neutralization step is preferably carried out by dividing the flow of creamed magnesium hydroxide slurry, acidifying a part with hydrochloric acid and the remainder with a hydrochloric-sulfuric acid mixture, and then recombining the two neutralized brines, it may be convenient to neutralize both portions of the creamed slurry with mixtures of hydrochloric and sulfuric acids, one portion with a mixture containing a high proportion of hydrochloric acid and the other with an acid mixture containing mostly sulfuric acid, and then to combine the two neutralized liquors to effect calcium sulfate adjustment, as described. Again, in another modification, after the magnesium hydroxide slurry resulting from the creaming step has been divided into two portions, the one is neutralized with a hydrochloric acid-sulfuric acid mixture and the other with hydrochloric acid alone, the two resulting neutralized brines then being evaporated separately, after which the concentrated brines are mixed in measured proportions to remove calcium and sulfate. In further modifications, the creamed magnesium hydroxide slurry may be acidified in one step with a mixture of the two acids in controlled proportions, or the entire mixture may be acidified with hydrochloric acid alone, and a soluble sulfate thereafter added to react with the dissolved calcium salts in the adjusting step, either prior to or subsequent to evaporation to 30 to 40 per cent magnesium chloride concentration.

The removal of calcium salts and sulfate from the neutralized magnesium chloride brine may also be effected according to the invention by methods differing slightly in detail from the careful calcium-sulfate adjusting operation already described. For instance, the neutralization may be carried out with hydrochloric acid or hydrochloric and sulfuric acid mixtures in such manner as to produce a substantial equivalency of calcium and sulfate in the neutralized magnesium chloride brine, thus insuring removal of most of the calcium and sulfate as calcium sulfate precipitate, but leaving, however, a slight excess of calcium or sulfate, as may be convenient. Then the resulting brine, after filtration or settling to remove the calcium sulfate already precipitated, silt, etc., and preferably but not necessarily also after evaporation to 30–40 per cent magnesium chloride concentration, may be later treated with a strong calcium chloride solution or with a strong soluble sulfate solution, e. g. sodium sulfate, in a proportion sufficient to produce substantially exact equivalency of calcium and sulfate. The small additional amount of calcium sulfate so formed is then removed, leaving a practically pure magnesium chloride solution. In an alternative procedure, useful when a slight amount of excess sulfate is present in the evaporated neutralized brine, the bulk of precipitated calcium sulfate is removed as explained, after which a solution of a barium salt, e. g. barium chloride, is added in a proportion just sufficient to remove the dissolved sulfate as barium sulfate precipitate.

In the foregoing process description milk of lime, i. e. calcium hydroxide, has been referred to as the alkaline precipitant for magnesium hydroxide. Either high calcium lime or dolomite lime may be used for the purpose. In some cases dolomite lime will be preferred for the reason that its magnesia content is added to the output of magnesium hydroxide and, in turn, of magnesium chloride. An alkali metal hydroxide, e. g. sodium hydroxide, may also be used, if desired.

This application is a continuation-in-part of our prior application Serial No. 405,190, filed August 2, 1941.

We claim:
1. In a method of treating sea water to recover magnesium salts therefrom as substantially pure magnesium chloride, the steps which comprise: treating the sea water with milk of lime in a proportion sufficient to react with all the magnesium salts in the sea water and to produce in the treated water an alkalinity above 0.01 N but not materially exceeding 0.03 N, thereby forming a precipitate consisting essentially of magnesium hydroxide but also containing small proportions of calcium salts and sodium chloride as impurities; separating the magnesium hydroxide precipitate from the treated sea water; creaming the precipitate with sufficient magnesium chloride brine containing 8 to 15 per cent by weight of magnesium chloride to form a suspension of magnesium hydroxide; dividing the creamed suspension into two portions; neutralizing one portion with aqueous hydrochloric acid in a quantity sufficient to produce in the neutralized solution a pH value of about 5.5 to about 7.0, forming magnesium chloride solution, and neutralizing the other portion with an aqueous mixture of hydrochloric acid and sulfuric acid in a quantity sufficient to produce in the neutralized solution a pH value about 5.5 to about 7.0, forming a solution of magnesium chloride containing soluble sulfate, both such solutions also containing small proportions of calcium salts and sodium chloride as impurities; combining the two neutralized solutions in such proportions that the resulting solution contains sulfate in a quantity substantially equivalent stoichiometrically to that of the calcium salts dissolved therein; removing insoluble impurities from the combined solution and evaporating the clarified solution to a concentration between about 30 and about 40 per cent by weight of magnesium chloride, at which concentration the calcium sulfate and sodium chloride impurities are substantially insoluble therein; agitating the evaporated solution for a period sufficient to permit the calcium sulfate and sodium chloride impurities to precipitate substantially completely; removing the precipitated impurities by filtration; and evaporating the filtered solution to recover the magnesium chloride therefrom in solid form.

2. In a method of treating brines containing magnesium and calcium salts to recover the magnesium content thereof as substantially pure magnesium chloride, the steps which consist in mixing with the brine an excess of alkali over the chemical equivalent of the magnesium salts therein but not substantially more than is required to produce in the treated brine a soluble alkalinity of 0.065 N, thereby forming a precipitate of magnesium hydroxide, separating the precipitate, creaming the separated precipitate with magnesium chloride solution to produce a uniform suspension, neutralizing the suspension with aqueous hydrochloric acid and producing in the solution a concentration of sulfate substantially equivalent stoichiometrically to that of residual calcium salt impurities therein, to form a solution of magnesium chloride containing calcium sulfate together with sodium chloride as impurities, evaporating the solution to a concentration at which the calcium sulfate and sodium chloride are substantially insoluble therein, separating the insoluble impurities, and further evaporating the purified solution to recover magnesium chloride in solid form.

3. In a method of treating sea water to recover substantially pure magnesium chloride therefrom, the steps which consist in mixing with the sea water an excess of milk of lime over the chemical equivalent of the magnesium salts therein but not substantially more than is required to produce in the treated sea water a soluble alkalinity of 0.04 N, thereby forming a precipitate of magnesium hydroxide, separating the precipitate, creaming the separated precipitate with magnesium chloride solution to produce a uniform suspension, dividing the suspension into two portions, neutralizing one portion with aqueous hydrochloric acid to form a solution of magnesium chloride, neutralizing the other portion with aqueous hydrochloric acid and sulfuric acid to form a solution of magnesium chloride containing soluble sulfate, both such solutions also containing a small proportion of calcium salts as impurity, combining the two neutralized solutions in such proportions that the resulting solution contains sulfate in a quantity substantially equivalent stoichiometrically to that of the calcium salts dissolved therein, evaporating the combined solutions to a concentration at which calcium sulfate is substantially insoluble therein, filtering the evaporated solution to remove such calcium sulfate, and further evaporating the filtered solution to recover the magnesium chloride therefrom in solid form.

4. In a method of treating natural brines containing magnesium salts together with a small proportion of boron compounds to recover magnesium chloride therefrom with a low content of boron as impurity, the steps which consist in adding to the brine an alkali in excess of the chemical equivalent of the magnesium salts therein sufficient to produce in the treated brine a soluble alkalinity between 0.01 N and 0.065 N, whereby a precipitate of magnesium hydroxide is formed having a low boron content, separating the precipitate, dissolving the separated precipitate in aqueous hydrochloric acid to form a substantially neutral solution of magnesium chloride, and recovering solid magnesium chloride from the latter solution.

5. In a method of treating natural brines containing magnesium salts together with a small proportion of boron compounds to recover the magnesium content thereof in a form having a low content of boron as impurity, the steps which consist in adding milk of lime to the brine in excess of the chemical equivalent of the magnesium salts therein sufficient to produce in the treated brine a soluble alkalinity between 0.01 N and that which corresponds to the limit of solubility of calcium hydroxide therein, whereby a precipitate of magnesium hydroxide is formed having a low boron content, and separating the precipitate from the treated brine.

6. In a method of treating sea water to recover the magnesium content thereof in a form having a low content of boron as impurity, the steps which consist in adding milk of lime to the sea water in excess of the chemical equivalent of the magnesium salts therein sufficient to produce in the treated sea water a soluble alkalinity between 0.01 N and 0.04 N, whereby a precipitate of magnesium hydroxide is formed having a low boron content, and separating the precipitate from the treated sea water.

7. In a method of treating natural brines containing magnesium salts together with a small proportion of boron compounds to recover the magnesium content thereof in a form having a low content of boron as impurity, the steps which consist in adding to the brine an alkali in excess of the chemical equivalent of the magnesium salts therein sufficient to produce in the treated brine a soluble alkalinity between 0.01 N and 0.065 N, whereby magnesium hydroxide is precipitated having a low boron content, and separating the precipitate from the aqueous liquor.

SHELDON B. HEATH.
FOREST R. MINGER.